May 20, 1941.    W. BURG    2,242,507
MANUFACTURE OF SODIUM SULPHATE
Filed Jan. 28, 1938
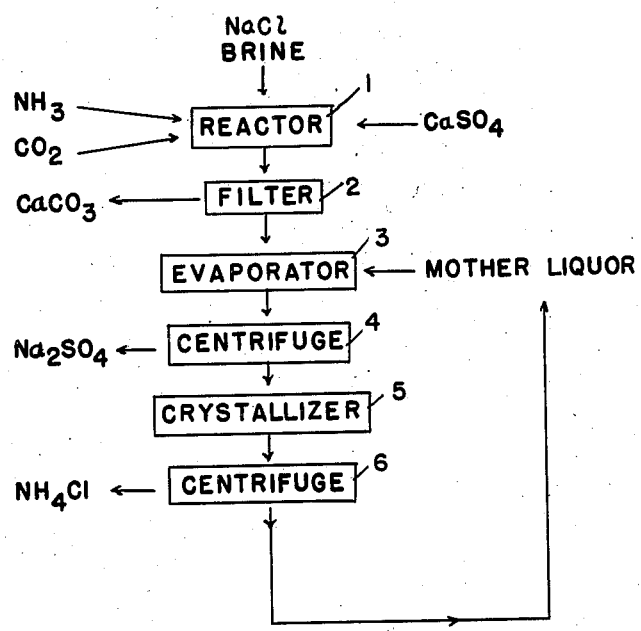
INVENTOR
WALTER BURG
BY
ATTORNEYS Patented May 20, 1941

2,242,507

UNITED STATES PATENT OFFICE 2,242,507

MANUFACTURE OF SODIUM SULPHATE

Walter Burg, Toledo, Ohio, assignor of one-half to Robert L. Burg, Louisville, Ky.

Application January 28, 1938, Serial No. 187,338
In Germany November 4, 1937

1 Claim.  (Cl. 23—100)

The invention consists of an improved method of manufacturing sodium sulphate, especially in the anhydrous state, by reacting sodium chloride and calcium sulphate with ammonia, carbon dioxide, and water.

Heretofore it has been proposed to produce sodium sulphate by reacting calcium sulphate, dispersed in an aqueous medium, with ammonia and carbon dioxide with the formation of ammonium sulphate and calcium carbonate. After removal of calcium carbonate, ammonium sulphate is reacted with solid sodium chloride under such conditions that sodium sulphate precipitates. The latter is removed and ammonium chloride crystallized from the remaining solution. Thus in this process two distinctly separate reactions can be observed: (a) formation of calcium carbonate and ammonium sulphate from calcium sulphate, ammonia, carbon dioxide, and water; (b) formation of sodium sulphate and ammonium chloride from the ammonium sulphate, produced in the first reaction, and solid sodium chloride. These two reactions are either carried out as two separate processes or they are coupled with each other. In the use of separate processes two mother liquors are circulated separately, while in the coupled process only one mother liquor is employed which serves as the medium for the initial reaction. Either modification requires the use of solid sodium chloride in order to avoid evaporation for the purpose of separating sodium sulphate. Both modifications also have in common that the medium for the first reaction (formation of calcium carbonate and ammonium sulphate) contains considerable quantities of dissolved alkali sulphates.

My improved process has for its main object the simplification and cheapening of the production of sodium sulphate, enabling production with a single reactor.

Another important object is the use of brine, either natural or artificial, in the single reactor, in conjunction with ammonia, carbon dioxide and calcium sulphate.

A further object is the continuous use of the mother liquor remaining after extraction of sodium sulphate and ammonium chloride, by recirculating it into the next run after the formation of calcium carbonate therein is completed, whereby the mother liquor does not pass through the reactor.

My improved process comprises the following steps: Reacting brine, either natural or artificial, with ammonia, carbon dioxide and calcium sulphate in a single reactor, then removal of calcium carbonate from such solution, as by filtering, then adding mother liquor from a preceding run to the filtrate, then concentrating such combined solution, as by evaporation, then removal of sodium sulphate, as by centrifuging, then separating out ammonium chloride, as by cooling, and then removing ammonium chloride, as by again centrifuging.

The mother liquor remaining after such removal of ammonium chloride is retained, but is not returned to the reactor. Instead it is recirculated into a later phase of the process, as for example, into the evaporator vessel wherein the next product from the single reactor is introduced after extraction of calcium carbonate from such next product. This mother liquor contains the same ions as the filtrate and, if desired, the composition of the mother liquor can be changed at will without considering the conditions most favorable for formation of calcium carbonate. It therefore may be an appropriate means of regulating the concentration of the filtrate with respect to an optimal separation of sodium sulphate and ammonium chloride.

The brine may or may not be reacted simultaneously with the other three mentioned ingredients in the reactor. If desired, the brine can first be treated with ammonia and carbon dioxide, and the resulting solution reacted with the calcium sulphate.

In the diagram shown in the drawing, the numeral 1 designates the single reactor, and the arrows indicate that the four ingredients, to-wit, brine, NaCl in solution, ammonia, $NH_3$, carbon dioxide, $CO_2$, and calcium sulphate, $CaSO_4$, are introduced into the reactor. These ingredients may be mixed in any order. The numeral 2 designates a filter, whereby the calcium carbonate, $CaCO_3$, is extracted from the solution produced in the reactor, the arrow indicating that the calcium carbonate is removed at this point. The numeral 3 designates an evaporator wherein the solution remaining after extraction of calcium carbonate is concentrated until sufficient crystallization of sodium sulphate has taken place. Ordinarily this is done in a closed vessel and the expelled gases trapped for re-use. The numeral 4 designates the first centrifuge, wherein sodium sulphate, $Na_2SO_4$, is removed from the concentrated solution. The removal of this product can be obtained while the liquor is warm. The numeral 5 designates a crystallizer apparatus wherein the solution remaining after extraction of sodium sulphate is cooled until sufficient crystallization of ammonium chloride has taken place. The numeral 6 designates the second centrifuge wherein ammonium chloride, $NH_4Cl$, is removed from the cooled solution. The mother liquor remaining after such removal is shown as returned to the evaporator 3 wherein it is mixed with the next product from the reactor after such product has had the calcium carbonate removed therefrom.

The advantages of my improved process are believed to be evident. First, it is simpler because it requires but a single reactor. Second, my process enables the use of brine rather than solid salt, which makes it especially suitable for plants where artificial or natural brines are available, no special evaporation of the latter being necessary. Third, the initial solution, which alone enters the reactor, does not contain any appreciable amounts of dissolved sulphates—the mother liquor being returned in a later phase of the process and not passing through the reactor—whereby a smaller excess of ammonia and carbon dioxide over the stoichiometrical quantity is required than if larger amounts of alkali sulphates were present in the solution passing through the reactor. Moreover, on evaporating the filtrate after the calcium carbonate is removed from the solution, the dissolved amounts of ammonia and carbon dioxide are substantially entirely expelled, and can be recovered and re-used.

The separated calcium carbonate can be burned for liberation of carbon dioxide and the latter returned to the process, while quicklime from the calcium carbonate can be slacked and the slacked lime used to decompose ammonium chloride for liberation of ammonia which is then returned to the process.

All of the above mentioned savings and advantages tend to a more economical production of sodium sulphate.

The following is an example of the carrying out of my improved process:

In the reactor 48.43 parts of finely ground gypsum, $CaSO_4$, or the corresponding amount of anhydrite, are dispersed in a brine consisting of 100 parts of water and 32.88 parts of sodium chloride. Ammonia and carbon dioxide are then passed into this dispersion while the temperature is maintained at approximately 40° C. and the reactants are thoroughly mixed by continuous stirring. After 9.58 parts of ammonia and 12.38 parts of carbon dioxide have reacted with the brine suspension of gypsum (or anhydrite), a precipitate consisting of approximately 28 parts of calcium carbonate is filtered out at a temperature of approximately 40° C. The precipitate is washed with as little water as possible and the wash water added to the filtrate. This filtrate solution is passed into the evaporator for concentrating—and mother liquor from a previous run is combined with the solution prior to such evaporation. The solution is concentrated until approximately 39 parts of sodium sulphate have been crystallized and these crystals are then removed by centrifuging. The remaining solution is then cooled in the crystallizer, until approximately 30 parts of ammonium chloride have been crystallized and these crystals are then removed by again centrifuging. After removal of the ammonium chloride, the remaining mother liquor which contains approximately 36 parts of ammonium chloride, 26 parts of sodium sulphate and 3 parts of sodium chloride per 100 parts of water, is returned to the process by adding it to the filtrate of the next run.

Modification and variation of the invention, as hereinbefore set forth, may readily be made without departure from the spirit and scope of said invention.

What I claim is:

The process of manufacturing sodium sulphate and ammonium chloride which consists of first treating a solution of sodium chloride with ammonia and carbon dioxide, then reacting calcium sulphate with the solution, then filtering out calcium carbonate, then adding mother liquor from a preceding run, then concentrating the filtrate and mother liquor by evaporation until a substantial precipitation of sodium sulphate has taken place, removing sodium sulphate by filtration, then cooling the remaining solution and filtering ammonium chloride from the cooled solution.

WALTER BURG.